C. A. COSTELLO.
HITCHING DEVICE.
APPLICATION FILED JAN. 3, 1916.
1,183,634.
Patented May 16, 1916.
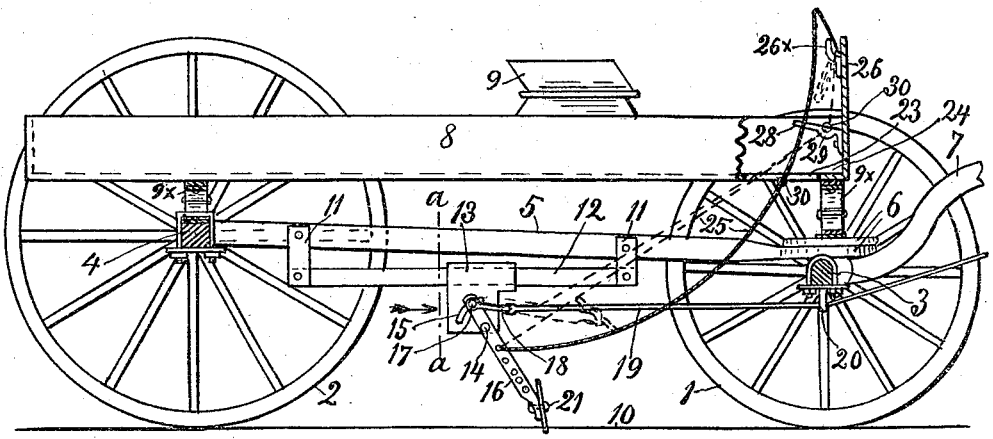
FIG. 1.
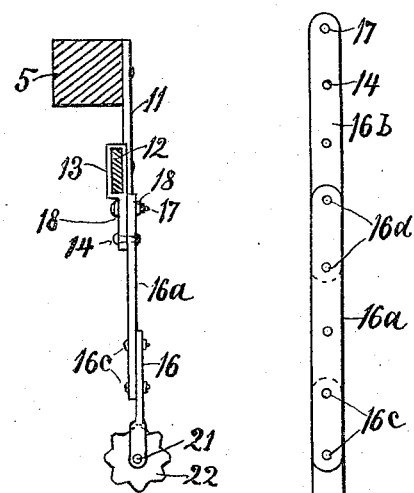
FIG. 3.
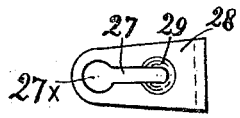
FIG. 2.
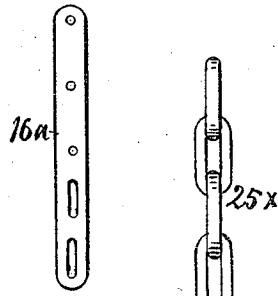
FIG. 5.   FIG. 6.
INVENTOR:
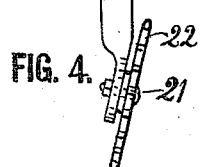
BY his ATTORNEY:

UNITED STATES PATENT OFFICE.

CHARLES A. COSTELLO, OF ST. PAUL, MINNESOTA.

HITCHING DEVICE.

1,183,634.      Specification of Letters Patent.      Patented May 16, 1916.

Application filed January 3, 1916. Serial No. 69,813.

*To all whom it may concern:*

Be it known that I, CHARLES A. COSTELLO, a subject of the King of Great Britain, residing at St. Paul, in the county of Ramsey and State of Minnesota, have invented a new and useful Hitching Device, of which the following is a specification.

My invention relates to horse hitching devices of the class attached to a draft animal and carried by the vehicle drawn by the animal, so as to be readily lowered to the ground and raised therefrom again by the driver riding on the vehicle.

The main object of the invention is to provide a hitching device of said class so constructed that it will take positive hold of the ground and not be apt to slide or slip.

Another object is to make such device adjustable to vehicles of different heights.

These and other objects I attain by the novel construction and arrangements of parts illustrated in the accompanying drawing, in which—

Figure 1 is a partly sectional side elevation of a light wagon with my new hitching device applied thereto. Fig. 2 is an enlarged top view of the bracket 28 in Fig. 1. Fig. 3 is an enlarged section on the line a—a in Fig. 1. Fig. 4 is an enlarged side elevation of what may be termed the anchoring bar of the device. Fig. 5 is a side view of the middle section of said bar. Fig. 6 is a portion of a chain which may be employed for raising and supporting the anchoring bar.

Referring to the drawing by reference numerals, 1 designates the front wheels, 2 the hind wheels, 3 the front axle, 4 the rear axle, 5 the reach, 6 the fifth wheel, 7 the thills, 8 the box, 9 the seat and 9× the springs of a delivery wagon, which is here used to represent any size and kind of wagon or even sleds.

Parallel to the ground 10 is secured upon the reach 5, or any other convenient part of the vehicle, by brackets 11, a flat bar 12, upon which is fitted to slide but not to rotate, a block 13 having a pivot 14 and with said pivot as the center, a segmental slot 15. Mounted on the stud 14 is the upper end of an anchoring bar or anchor bar 16, which in its upper end, above the supporting pivot 14, carries a clevis bolt 17 extending through the slot 15 and provided with a clevis 18, from which extends to the horse's bridle (not shown) a suitable hitching strap 19, which strap may be slidably supported in a guide 20.

Pivoted at 21 to the lower or forward end of the anchor bar 16 is a star-shaped or toothed disk 22, which when in contact with the ground, as shown in Fig. 1, will rotate on its pivot and thus prevent side strain on the bar when the vehicle may turn to right or left.

Extending from a suitable point of the bar 16 and up through an aperture 23 in the bottom 24 of the wagon box is a chain, cable or similar element 25, whose upward end may be attached to the dash-board 26 and when not in use may be coiled upon a hook 26× thereon. Said cable or strap is passed through a key-hole shaped aperture 27 in a suitably arranged plate or bracket 28, (best shown in Fig. 2), having a cavity 29 in which when the anchor bar is raised, as in dotted line in Fig. 1, a ball or knot or other obstruction 30 fixed on the cable may be placed so as to prevent accidental motion of the cable and obstruction into the wide end 27× of the aperture. If the element 25, or a portion of it, be a chain, like 25× in Fig. 6, it is obvious that either one of the chain links may be slipped edgewise into the narrow part of the aperture 27 and have the next higher link lodged endwise down into the cavity 29, and will there take the place and perform the service of the obstruction 30.

In the operation or use of the device, when the anchor bar is in contact with the ground and thus stands at an incline thereto, and the draft animal or animals hitched to the vehicle should attempt to pull the vehicle forward, the bar 16 will cause the block 13 to remain unmoved and thereby to hold back on the bit strap or line 19 and thus prevent any essential movement of the animals and the vehicle. And when the driver returns to the vehicle and raises the bar 16 by the cable 25, the horse or horses are again at liberty to be driven forward.

In case the ground is soft or has cavities the bar 16 is prevented by the clevis pin 17 and the front terminal of the slot 15 from swinging farther rearward than to its regular incline, about as shown in Fig. 1.

The length of the anchor bar may be varied according to the height of the vehicle. Such adjustment may be secured by various means, one of which is to make the bar in several perforated and overlapped sections, 16, 16ª and 16ᵇ, and secure them together by bolts 16ᶜ, 16ᵈ, the bolt holes in all the sections being the same distance apart; and for still finer adjustment some of the holes may be slotted as shown in Fig. 5. For use on high vehicles all three of the sections may be used, as in Fig. 4. For lower vehicles two sections may be used, as in Fig. 3, and for sleighs and very low wagons only one section may be used, as in Fig. 1.

What I claim is:

1. In a device of the class described, the combination with a vehicle adapted to be drawn by one or more draft animals, of a longitudinally disposed angular bar spaced from and secured at its ends to the vehicle in substantially parallel relation to the ground, a block slidably fitted on said bar, an anchor bar pivoted near its rear end to said block and adapted when its forward end is lowered to the ground to assume an inclined position so as to retard forward movement of the block with the vehicle, a peripherally toothed disk pivoted near the lower end of the anchoring bar and projecting edgewise beyond the same in transverse position to the vehicle, a strap adapted to extend to the draft animal, or animals, and having operative connection with said slidable block, and means controlled from within the vehicle for raising and lowering said anchor bar, and means for easily securing said bar in such raised position.

2. In a device of the class described, the combination with a vehicle adapted to be drawn by one or more draft animals, of a bar spaced from and secured at its ends to the vehicle in a longitudinal direction thereof and in substantially parallel relation to the ground, a block slidable but not rotatable on the bar, an anchor bar pivoted near its rear end to the block and adapted when its forward end is lowered to the ground to assume an inclined position and thereby hinder forward movement of the block with the vehicle, a strap adapted to extend to the draft animal, or animals, and having operative connection with the block, means for raising and lowering the anchor bar from within the vehicle, means for supporting the anchor bar in raised position and means for supporting it in the inclined position.

3. In a device of the class described, the combination with a vehicle, of a block mounted to slide in longitudinal direction on the vehicle, an anchor bar pivoted with one end to the block and means for holding the other end of it in a forwardly inclined position, means preventing lateral swinging of the block and the bar, a disk pivotally mounted on the lower or forward end of the bar and adapted to engage in the ground and also to prevent undue lateral strain on the bar by rolling toward either side of the vehicle; means for raising and lowering of said bar, and means for connecting a draft animal, or animals with the sliding block.

4. In a hitching device of the class described, the combination with a pivoted anchor bar, of a toothed disk mounted to rotate on the forward end of the bar in transverse direction of the vehicle, and means for raising and lowering the bar with said disk away from or into the ground, substantially arranged as and for the purposes specified.

In testimony whereof I affix my signature.

CHARLES A. COSTELLO.